(No Model.)

G. STICKLEY.
SANDPAPERING WHEEL.

No. 581,787. Patented May 4, 1897.

Fig. 3ª

Witnesses.
Mark W. Dewey
R. S. Dewey

Inventor.
Gustave Stickley
By C. H. Duell
his Attorney.

UNITED STATES PATENT OFFICE.

GUSTAVE STICKLEY, OF SYRACUSE, NEW YORK.

SANDPAPERING-WHEEL.

SPECIFICATION forming part of Letters Patent No. 581,787, dated May 4, 1897.

Application filed September 12, 1895. Serial No. 562,245. (No model.)

*To all whom it may concern:*

Be it known that I, GUSTAVE STICKLEY, of Syracuse, in the county of Onondaga, in the State of New York, have invented new and useful Improvements in Sandpapering-Wheels, of which the following, taken in connection with the accompanying drawings, is a full, clear, and exact description.

My invention relates to sandpapering-belts; and the object is to provide a belt that will be simple in construction and at the same time be capable of adapting itself to very many if not every shape or form—that is, the belt or band is flexible and so constructed that the irregular edges of the pieces for furniture may be sandpapered or smoothed easily and quickly thereon without changing belts.

To this end my invention consists in the combination, with a grooved wheel or wheels, of a solid elastic belt having normally a flat even periphery, a tongue to fit in the grooves, and the side edges sharp, substantially as shown, and a band of sandpaper on the periphery of the elastic belt having its edges turned over the edges of the belt.

Figure 1:
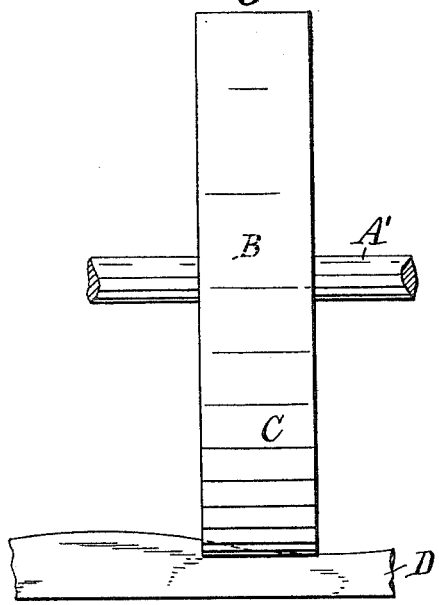
Figure 2:
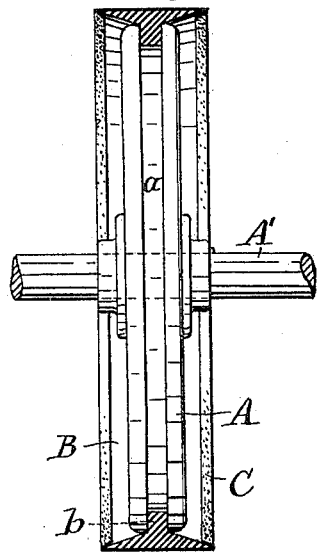
Figure 4:
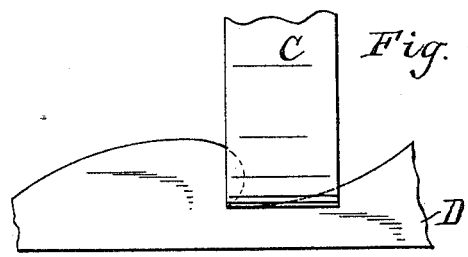
Figure 3:
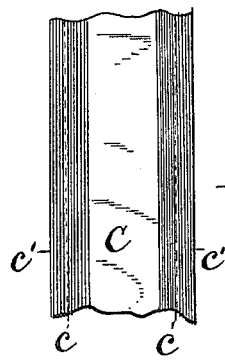
Figure 5:
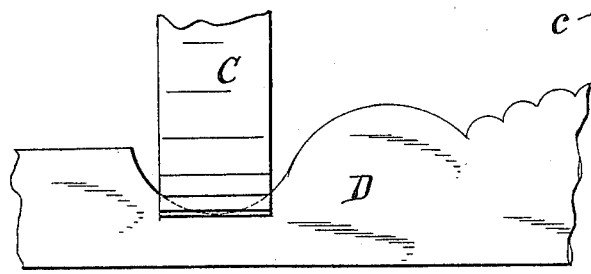
Figure 6:
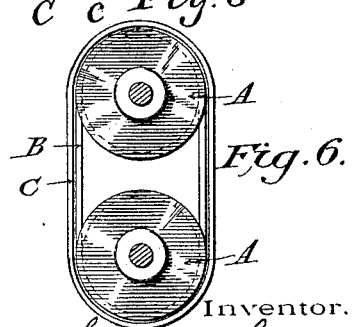

In the drawings hereto annexed and forming a part of this specification, Figure 1 is a top plan view of the upper wheel in contact with the irregular edge of a board. Fig. 2 is an edge view of the lower wheel with the elastic band and sandpaper band thereon shown in cross-section. Fig. 3 shows the inner side view of a portion of the sandpaper band before the edges are bent inward. Fig. 3ᵃ shows the band after the edges are bent over. Figs. 4 and 5 illustrate, together with Fig. 1, the adaptability of the belt to fit and smooth various forms of stock; and Fig. 6 shows the band or belt passing around two wheels.

Referring specifically to the drawings, A indicates a wheel, pulley, or support for the elastic belt.

B is the elastic belt, and C is the sandpaper band mounted on the ring.

The wheel A has a groove $a$ in its periphery midway between its sides and may be made in one piece or in two or more parts, as desired.

A' is the shaft of the wheel.

The elastic belt B is made of rubber and is provided with a rib or tongue $b$ on its inner side to lie and fit in the grooves $a$ in the wheels. The outer surface of the belt is normally smooth and even. The side edges of the belt extend equal distances in opposite directions from and beyond the sides of the wheels. The inner sides of the belt between the tongue and the edges are beveled or converge toward said edges, which are sharp, as clearly shown in Fig. 2 of the drawings.

The band of sandpaper C is cut somewhat wider than the elastic belt, so that its edges may be turned inward toward the rib thereon. The band of sandpaper is creased on the dotted lines $c\ c$ before it is applied to the belt.

In order that the band will be reinforced or remain with its side edges bent in after it is applied to the rubber belt, I coat the sandpaper on its back a distance from each edge with glue $c'\ c'$. If desired, the glue may cover the entire back of the paper. Although the thin coating of glue is dry before it is applied to the belt and does not cement the parts together, the sandpaper band will remain folded or bent on the dotted lines and cannot work off the wheel.

It will be apparent that with this construction it will be possible to sandpaper or smooth almost any irregularly-shaped edge on a board.

The belt being of elastic material and of the shape shown will accommodate itself to the different shapes without trouble, as shown in Figs. 1, 4, and 5. D in said figures indicates the work or boards operated upon. The sandpaper band being loose it may be easily replaced by another when worn out.

It will be obvious that with two wheels A the elastic belt B would pass around both wheels.

Having described my invention, what I claim as new, and desire to secure by Letters Patent, is—

1. The combination with a grooved wheel, of a solid elastic belt having normally a smooth even periphery, a tongue to fit in the groove, and the side edges sharp, substantially as shown, and a band of sandpaper on the periphery of the elastic belt having its edges turned over the edge of the belt, substantially as set forth.

2. The combination with the grooved wheels, of a solid elastic belt having normally a smooth even periphery, a tongue to fit in the groove, and the side edges sharp, substantially as shown, and a band of sandpaper mounted loosely on the periphery of the elastic belt having its edges turned over the edge of the belt and forming acute angles, and glue on the back side of the sandpaper band but not adhering to the belt, as and for the purpose described.

3. As an article of manufacture, a belt formed of sandpaper and provided with a coating of glue or similar stiffening material on its back, and having its edges bent over upon itself and forming acute angles at the bends, as set forth.

In testimony whereof I have hereunto signed my name.

GUSTAVE STICKLEY. [L. S.]

Witnesses:
MARK W. DEWEY,
H. M. SEAMANS.